(12) United States Patent
Broschek Santelices et al.

(10) Patent No.: US 9,902,628 B2
(45) Date of Patent: Feb. 27, 2018

(54) CONTINUOUS AND MODULAR TREATMENT SYSTEM FOR REMOVING BORON, CONSISTING OF A BORON REMOVAL SYSTEM TOGETHER WITH A RESIN REGENERATION SYSTEM INCLUDING THREE COLUMNS

(71) Applicant: FUNDACION CHILE, Santiago (CL)

(72) Inventors: Ulrike Broschek Santelices, Santiago (CL); Karien Volker Kroeger, Santiago (CL); Cecilia Vidal Cruz, Santiago (CL)

(73) Assignee: FUNDACION CHILE, Santiago (CL)

( * ) Notice: Subject to any disclaimer, the term of this patent is extended or adjusted under 35 U.S.C. 154(b) by 0 days.

(21) Appl. No.: 15/125,493

(22) PCT Filed: Mar. 27, 2014

(86) PCT No.: PCT/CL2014/000011
§ 371 (c)(1),
(2) Date: Sep. 12, 2016

(87) PCT Pub. No.: WO2015/135088
PCT Pub. Date: Sep. 17, 2015

(65) Prior Publication Data
US 2017/0081215 A1    Mar. 23, 2017

(30) Foreign Application Priority Data
Mar. 10, 2014  (CL) .................................... 579-2014

(51) Int. Cl.
*C02F 1/42* (2006.01)
*B01D 15/36* (2006.01)
*C02F 101/10* (2006.01)

(52) U.S. Cl.
CPC .............. *C02F 1/42* (2013.01); *B01D 15/361* (2013.01); *C02F 2101/108* (2013.01);
(Continued)

(58) Field of Classification Search
CPC .... B01D 15/361; C02F 1/42; C02F 2101/108; C02F 2209/005; C02F 2209/40; C02F 2209/42; C02F 2209/44; C02F 2303/16
See application file for complete search history.

(56) References Cited

U.S. PATENT DOCUMENTS 5,811,012 A    9/1998 Tanabe et al.

FOREIGN PATENT DOCUMENTS

JP    2001335315 A    12/2001
JP    2005296953 A  * 10/2005
(Continued)

OTHER PUBLICATIONS

Spanish Patent Office, International Search Report for Application PCT/CL2014/000011, pp. 1-5, dated Dec. 2, 2014.
(Continued)

*Primary Examiner* — Dirk Bass
(74) *Attorney, Agent, or Firm* — Gottlieb, Rackman & Reisman, P.C.

(57) ABSTRACT

The invention relates to a continuous and modular treatment system for removing boron from natural, urban, rural and irrigation water, made up of a boron removal system together with a resin regeneration system, wherein the treatment system comprises three columns (C-1, C-2, C-3), each column being packed with an ion exchange resin specific for removing boron. Said columns are arranged in series and operate alternatingly in a fining-refining configuration, meaning that two of the three columns are in simultaneous operation in the boron removal system, while the third column is in regeneration. The invention further relates
(Continued)

to a method for operating the system, comprising the steps of removing boron and the steps of regenerating the saturated resin.

4 Claims, 9 Drawing Sheets

(52) U.S. Cl.
CPC .... *C02F 2209/005* (2013.01); *C02F 2209/40* (2013.01); *C02F 2209/42* (2013.01); *C02F 2209/44* (2013.01); *C02F 2303/16* (2013.01)

(56) References Cited

FOREIGN PATENT DOCUMENTS

| KR | 20020066775 A | 8/2002 |
|---|---|---|
| WO | 2001049389 | 7/2001 |
| WO | 2002096807 | 12/2002 |
| WO | 2009073175 | 6/2009 |

OTHER PUBLICATIONS

Spanish Patent Office, Written Opinion of the International Searching Authority or Application PCT/CL2014/000011, pp. 1-13, dated Dec. 2, 2014.
International Searching Authority, International Search Report, pp. 1-5.
International Searching Authority, Written Opinion of the International Searching Authority, pp. 1-13.

* cited by examiner

CONTINUOUS AND MODULAR TREATMENT SYSTEM FOR REMOVING BORON, CONSISTING OF A BORON REMOVAL SYSTEM TOGETHER WITH A RESIN REGENERATION SYSTEM INCLUDING THREE COLUMNS

FIELD OF THE INVENTION

The invention relates to the treatment of water with high boron content.

The present invention relates to a continuous and modular-type water treatment system that is easy to operate and maintain and is cost-efficient. Said system is based on using ion exchange resins specific for removing boron from natural, urban, rural and irrigation water. The system for which protection is requested constitutes an optimization of ion exchange technology.

The present invention further relates to the increase in the service life of the adsorbent element (ion exchange resin), maximizing the adsorption capacity and minimizing sewage streams.

The water to be treated preferably comes from sources located in the northern area of Chile between regions XV and III.

BACKGROUND OF THE INVENTION

Boron occurs naturally in the environment because it is released from the Earth's crust into bodies of water through erosion and infiltration processes. The presence of boron in natural water of the northern area of Chile is due to the existing boron deposits, since Chile is the third boron-producing country worldwide and the most important source is located in the evaporite basins known as salt flats, located in the northern area, specifically in Regions XV, I, II and III (Chong et al., 2000).

Water characterization results obtained by various public entities have found boron concentrations in water between 0.28 and 78 [mg/l]. The demand for water in the northern area has increased in recent years (considering only the city of Arica) to the point at which intake restrictions have been created. Studies for creating new supply sources are aimed at the Lluta river basin, but the physicochemical characteristics of the river's effluent render it unviable. Agricultural demands will not be met with the surface water resources, if the rate of growth of arable land is taken into account and it is considered that underground deposits are at their limit for population and industrial demands.

With respect to boron content in water, Chile does not include this element in the drinking water standard. However, the World Health Organization (WHO) recommends a maximum value of 0.5 [mg/l] for water for human intake. Furthermore, humans can also be exposed to boron through fruit and vegetable intake. The excessive intake of boron can cause health problems: vomiting, diarrhea, stomach, liver, kidneys and brain infections; irritation in the nose, throat and eyes. The prolonged intake of boron affects male reproductive organs. Five g of boric acid are required to make a person sick and 20 g can cause death.

The Chilean quality of water for irrigation standard (NCh 1333) establishes a limit of 0.75 [mg/l] of boron. This is because the boron content could generate toxic effects in some crops, affecting quality and yield. Boron toxicity can affect almost all crops depending on individual tolerances, the following crops being the most sensitive to boron: apple, broccoli, brussel sprouts, cabbage, carrot, cauliflower, citrus fruits, celery, clove, conifers, corn, lettuce, onion, apricot, peanut, pear, sunflower, sweet corn, sweet potato, beet, potato, tomato and turnip.

According to various alternatives that have been evaluated, in order to find a solution to the boron problems in the northern area of Chile, the use of crops resistant to the conditions of each area and also an improvement in the quality of irrigation water have been proposed. However, these measures generally mean a limitation on agricultural development since in the first case it limits crop diversification and the most resistant crops usually have a lower cost compared with others that are more sensitive.

In addition, with respect to the improvement of the quality of water some alternatives that have been evaluated are to prevent tributaries from contaminating watercourses, the deviation of natural basins, to prevent the mixture of irrigation water with drainage water, inter alia. However, measures of this type require building expensive civil works and further lead to a drop in water availability, which is critical since there is a water resource shortage in the affected areas.

Another alternative is to remove the contaminant from irrigation water by means of treatment technologies. This solution is possible but requires cost-efficient technologies that can be readily implemented.

Given this scenario, the Water and Environment Directorate of Chile Foundation (Gerencia de Agua y Medio Ambiente de Fundación Chile) started to search for a highly cost-effective technological solution that allowed improving the quality of water in northern Chile.

The technological comparison with respect to removal efficiencies included the analysis of technologies such as: reverse osmosis (40 to 60% of boron removal), electrodialysis (40 to 75%), co-precipitation (60%), adsorption (10 to 30%) and ion exchange and chelating processes (99%). According to the results obtained from the comparative analysis of existing worldwide technologies it was concluded that ion exchange technology based on the use of specific resins was the most efficient technology as regards its capacity to remove boron from water, reaching removal rates of about 99%. However, its operating cost is high due to the cost of the inputs required, particularly the specific ion exchange resin. These results marked the start of the study to develop the treatment system of the present invention. The study included developing columns, identifying lower-cost resins on the international market that afford good boron adsorption results while maintaining their efficiency in removing boron.

In the prior art, patent document JP2005058855 describes a method of recovering high-purity boron that comprises passing the water to be treated containing phosphoric acid and boron through a resin selective for boron adsorption. Then a mineral acid solution is circulated over the resin to remove adsorbed boron and an alkaline solution is circulated to remove acid from the resin.

Patent document JP2003094051 describes a method of regenerating a resin without having to adjust pH by incorporating hydrochloric acid or sulfuric acid. The method of regenerating boron adsorbed in the selective resin comprises eluting the resin with a mineral acid solution and then a NaOH solution is flushed through it. The amount of the NaOH solution to be added is controlled such that the pH of the solution around the resin is from 7.5 to 8.5

Patent document JP2002059154 describes a method of separating boron from a resin containing high adsorbed boron concentration, which comprises using from 0.5 to 2 mol/liter of hydrochloric acid or from 0.3 a 1 mol/liter of sulfuric acid, then neutralizing with an amount of alkali.

Patent document JP2005296953 describes an apparatus for treating boron-containing waste water and the associated method. The apparatus comprises three towers with ion exchange resins and four tanks for accumulating the liquid to be treated. The method comprises passing the boron-containing waste water through the first tower containing a strong acidic cation exchange resin adjusted for a type of H, then all the anions except boron are adsorbed and removed in a second tower having a weak basic anion exchange resin adjusted for a type of OH, then the boron is effectively absorbed and removed in a third ion exchange tower containing a mixture of a strong acidic cation exchange resin adjusted for a type of H and a strong basic anion exchange resin adjusted for a type of OH. The outflow from the third tower is recirculated into the system and is pooled with the boron-containing sewage water flow to be treated.

It can be seen from the prior art can that there are apparatus and processes associated with recovering boron from sewage flows through towers containing ion exchange resins, and there are processes for regenerating resins that comprise extracting the boron adsorbed in the resin.

However, there is still a need for processes and apparatus that allow extracting boron from sewage at lower operating costs and with high extraction efficiency.

The objective of the present invention consists of providing a system and an associated method of extracting boron from sewage that allows obtaining a better cost efficiency balance.

Furthermore, another objective of the present invention is to increase the service life of the ion exchange resin by means of reducing the amount of times it must be regenerated.

Another objective of the present invention is to achieve maximum utilization of the resin through maximum resin saturation, and to thereby be able to extract more highly concentrated boric acid during the step of regeneration.

Likewise, one objective of the present invention is to provide a continuous and modular system that allows removing boron in continuous flows performing boron extraction and resin regeneration in parallel, without having to stop the process during the step of regeneration.

SUMMARY OF THE INVENTION

The present invention corresponds to a continuous and modular treatment system, comprising a boron removal system together with a resin regeneration system, made up of three columns (C-1, C-2, C-3), each column being packed with a resin specific for removing boron present in natural, sewage, urban, rural and irrigation water; the columns are arranged in series and consist of a delivery system for feeding the water to be treated and the regeneration solutions; the system further comprises a water to be treated storage (buffer) tank; regeneration solution storage tanks; receiving tanks for the treated water and regeneration eluates. Two of the three columns are in operation at the same time in the boron removal system, whereas the third is on standby, waiting to be regenerated in the regeneration system. More treatment columns can be added depending on the concentration and flow rate to be treated.

BRIEF DESCRIPTION OF THE DRAWINGS

The invention will be described below in reference to the attached drawings in which.

DETAILED DESCRIPTION OF THE INVENTION

Figure 1:
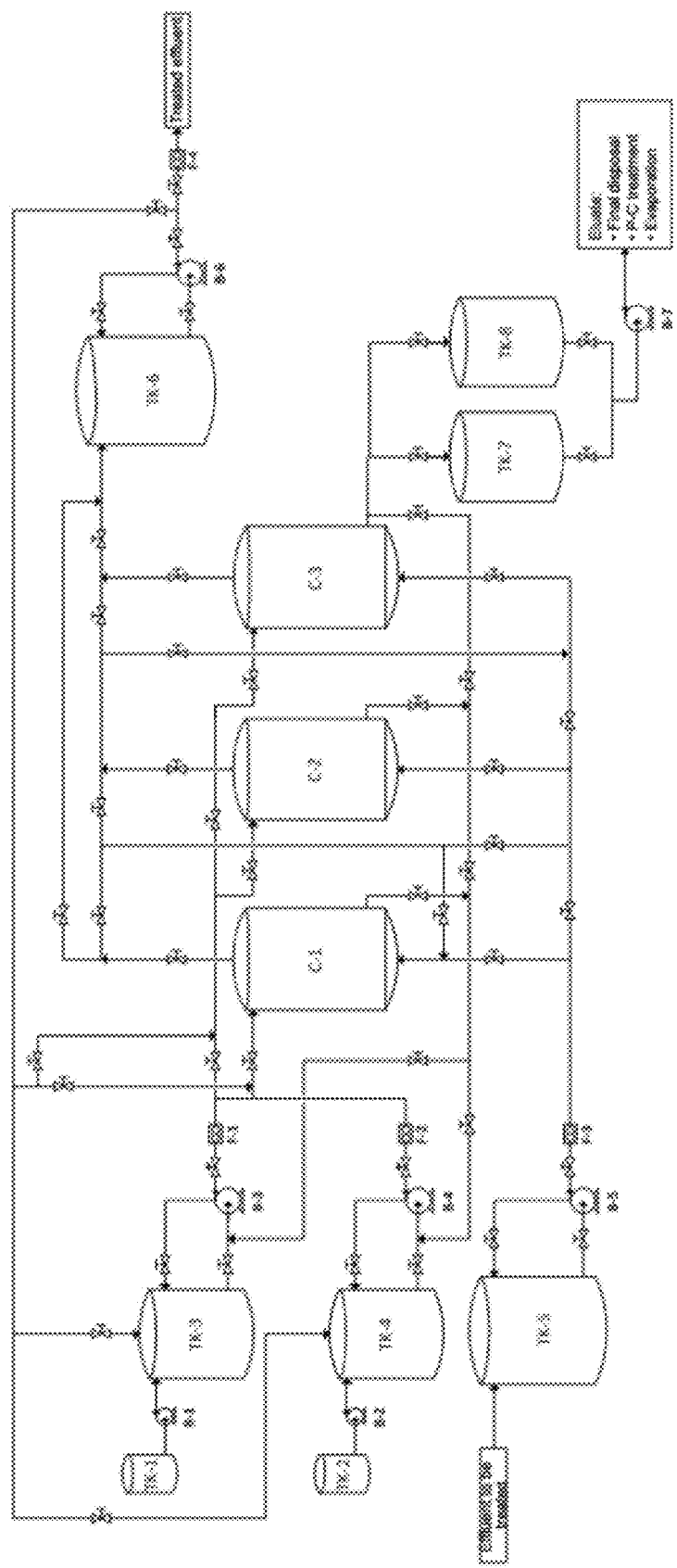
FIG. 1 shows a view of a general scheme of the treatment plant, where the complete diagram of the treatment system is shown.

The present invention corresponds to a continuous and modular water treatment system which allows both extracting or removing boron present in natural, sewage, urban, rural and irrigation water and regenerating resins that adsorb boron.

The present invention corresponds to a continuous and modular treatment system, comprising a boron removal system together with a resin regeneration system, made up of three columns (C-1, C-2, C-3), each column being packed with an ion exchange resin specific for removing boron present in natural, sewage, urban, rural and irrigation water; the columns are arranged in series and operate alternatingly in a fining-refining configuration, meaning that two of the three columns are in simultaneous operation in the boron removal system while the third column is in regeneration; the system further comprises a delivery system for transporting fluids in the treatment system; a water to be treated storage (buffer) tank; concentrated solution tanks; regeneration solution storage tanks; a receiving tank for the treated water and regeneration eluate tanks. The system additionally comprises 16 level sensors for detecting the tank level during either filling or draining. The invention considers placing two sensors per tank of the system. The system further comprises between 42 and 60 flow shut-off valves; 4 flow meters serving to measure and control the feed and output flows of the treatment system, define residence times and calculate the number of bed volumes passing through the column, which are located at the outlet of the regeneration solution storage tanks, at the outlet of the buffer tank and at the outlet of the treated water tank, respectively; a PLC (programmable logic controller) control system the function of which is to automate the system, to control flows and residence times and to perform the steps of the plant; and switchgear the function of which is to control the plant electrical systems and equipment. Table 1 shows a list of the elements forming the system of the present invention.

Two of the three columns are in operation at the same time and one is on standby, waiting to be regenerated.

More treatment columns can be added depending on the concentration and flow rate to be treated.

TABLE 1

List of main elements (equipment) of the system of the present invention
List of main equipment

| Name | Description |
| --- | --- |
| C-1 | Ion exchange column |
| C-2 | Ion exchange column |
| C-3 | Ion exchange column |
| TK-1 | Concentrated acid tank |
| TK-2 | Concentrated base tank |
| TK-3 | 1 acidic regeneration solution tank |
| TK-4 | 1 basic regeneration solution tank |
| TK-5 | 1 water to be treated tank |
| TK-6 | 1 treated water tank |
| TK-7 | 1 acidic eluate tank |
| TK-8 | 1 basic eluate tank |
| F1 | Flow meter 1 |
| F2 | Flow meter 2 |
| F3 | Flow meter 3 |
| F4 | Flow meter 4 |

Description of the Treatment Columns

The removal columns (C-1, C-2, C-3) of the present invention are columns made with resistant materials, such as fiberglass-reinforced plastics (FRP), high-density polyethylene (HDPE), carbon steel and stainless steel. The selection of the material will depend on parameters such as pressure, boron concentration and flow rate to be treated, since these are used to determine the size of the column, the regeneration cycles and the nature thereof (it must possess mechanical strength).

The diameter of the columns of the present invention ranges from about 250 [mm] to 4,000 [mm] and the height ranges from about 1,000 [mm] to 5,000 [mm]. The columns are internally packed with the resin specific for selective boron removal, and the resins that can be used for packing the columns are ion exchange resins for selective boron adsorption with N-methylglucamine groups, such as Purolite S-108 and Amberlite IRA 743, for example, and the resin packing volume is between 80 and 85% of the total column volume. The flow rate to be treated of the columns ranges from about 0.5 to 500 [l/s] and will depend on the boron concentration existing in the water to be treated. The resin is supported inside the column by a plate which allows the upward passage of water.

Description of the Tanks

The system of the present invention (FIG. 1) comprises the entry of the effluent to be treated (18) into a buffer tank (TK-5) for accumulating said effluent to be treated; an accumulation tank (TK-6) for accumulating the treated water; two tanks for storing reagents: one for storing 98% concentrated sulfuric acid ($H_2SO_4$) (TK-1) and the other one for storing 50% concentrated sodium hydroxide (NaOH) (TK-2); two dilution tanks: one for preparing the acidic regeneration solution (TK-3) and the other one for preparing the basic regeneration solution (TK-4); two tanks for accumulating eluates: one for the acidic eluate (TK-7) and the other one for the basic eluate (TK-8). All these tanks are connected to one another by means of feed and discharge pipes. The dimensions of the tanks of the system depend on the size of the columns and they must have a sufficient size so that the system can operate between 1 and 2 weeks continuously.

Description of the Delivery System

The fluids will be transported by means of a delivery system consisting of seven pumps (FIG. 1): the first pump (B-1) is located at the lower edge of the concentrated sulfuric acid tank (TK-1) and it is a metering pump responsible for transporting the $H_2SO_4$ to the acidic regeneration solution tank (TK-3); the second pump (B-2) is located at the lower edge of the concentrated sodium hydroxide tank (TK-2) and it is a metering pump responsible for transporting the concentrated NaOH to the basic regeneration solution tank (TK-4); the third pump (B-3) is located at the lower edge of the acidic regeneration solution tank (TK-3) and it is a delivery pump responsible for transporting the acidic solution to the column packed with specific resin which is boron-saturated, either C-1, C-2 or C-3, during the method of regenerating the saturated resin; the fourth pump (B-4) is located at the lower edge of the basic regeneration solution tank and it is a delivery pump responsible for transporting the basic regeneration solution to the column packed with specific resin which is boron-saturated and which has already been treated with the acidic solution during the method of regenerating; the fifth pump (B-5) is located at the lower edge of the water to be treated tank (TK-5) and it is a delivery pump responsible for transporting the water to be treated to the columns packed with specific resin (C-1, C-2, C-3); the sixth pump (B-6) is located at the lower edge of the treated water tank (TK-6) and it is a delivery pump responsible for transporting the treated water out of the system or into the system, to be used for subsequent treatment, irrigation and/or as input for generating the regenerating solutions; and the seventh pump (B-7) is located at the lower edge of the eluate accumulation tanks (TK-7 and TK-8) and it is a discharge pump responsible for transporting the acidic and basic eluates out of the system (20) for final disposal, physicochemical (P-C) treatment or evaporation. Table 2 shows a summary of the delivery system.

TABLE 2

List of delivery system pumps
List of delivery pumps

| Name | Description |
| --- | --- |
| B-1 | Concentrated acid metering pump |
| B-2 | Concentrated base metering pump |
| B-3 | Acid delivery pump |
| B-4 | Base delivery pump |
| B-5 | Water to be treated delivery pump |
| B-6 | Treated water delivery pump |
| B-7 | Eluate discharge pump |

In general, the boron removal system of the treatment system of the present invention comprises the water to be treated storage (buffer) tank (TK-5) operated by the fifth pump (B-5) and controlled by the flow meter (F-3); three columns C-1, C-2 and C-3; and the treated water receiving tank (TK-6) operated by the sixth pump (B-6) and controlled by the flow meter (F-4), for the exit of the treated effluent (19).

In turn, the saturated column regeneration system comprises the concentrated acid tank (TK-1) operated by the first pump (B-1) and the concentrated base tank (TK-2) operated by the second pump (B-2); the acidic regeneration solution tank (TK-3) operated by the third pump (B-3) and controlled by the flow meter (F-1) and the basic regeneration solution tank (TK-4) operated by the fourth pump (B-4) and controlled by the flow meter (F-2); three columns C-1, C-2, C-3; and the acidic eluate tank (TK-7) and basic eluate tank (TK-8) operated by the seventh pump (B-7).

Method for Operating the Modular Treatment System

The method for operating the modular treatment system contemplates two main steps, the step of removing boron through columns operating in a fining-refining configuration, and the step of regenerating the saturated resin in the column.

In general, the method of operating comprises passing the volume of water to be treated through the columns packed with the resin specific for removing boron. Boron accumulates in the resin generating treated boron-free water. As the water to be treated passes through the system, boron starts to accumulate in the resin, saturating it over time. When saturation occurs, the method of regenerating the resin is performed, which consists of cleaning the resin, which allows the resin to return to its original condition, which allows reusing it in a new treatment process referred to as operating cycle.

The resins can be regenerated in successive cycles with an estimated duration of between 3 and 10 years, mainly depending on the operating design and the physicochemical characteristics of the water to be treated. The specific resin to be used has a specific functional group that selectively captures boron.

Step of Removing Boron in the Columns

The columns of the modular treatment system of the present invention are identified as C-1, C-2, C-3, and said columns are arranged in series and operate alternatingly in a configuration referred to as fining-refining. This means that two of the columns are in simultaneous operation, whereas the third column is in the step of regeneration or on standby.

Figure 2:
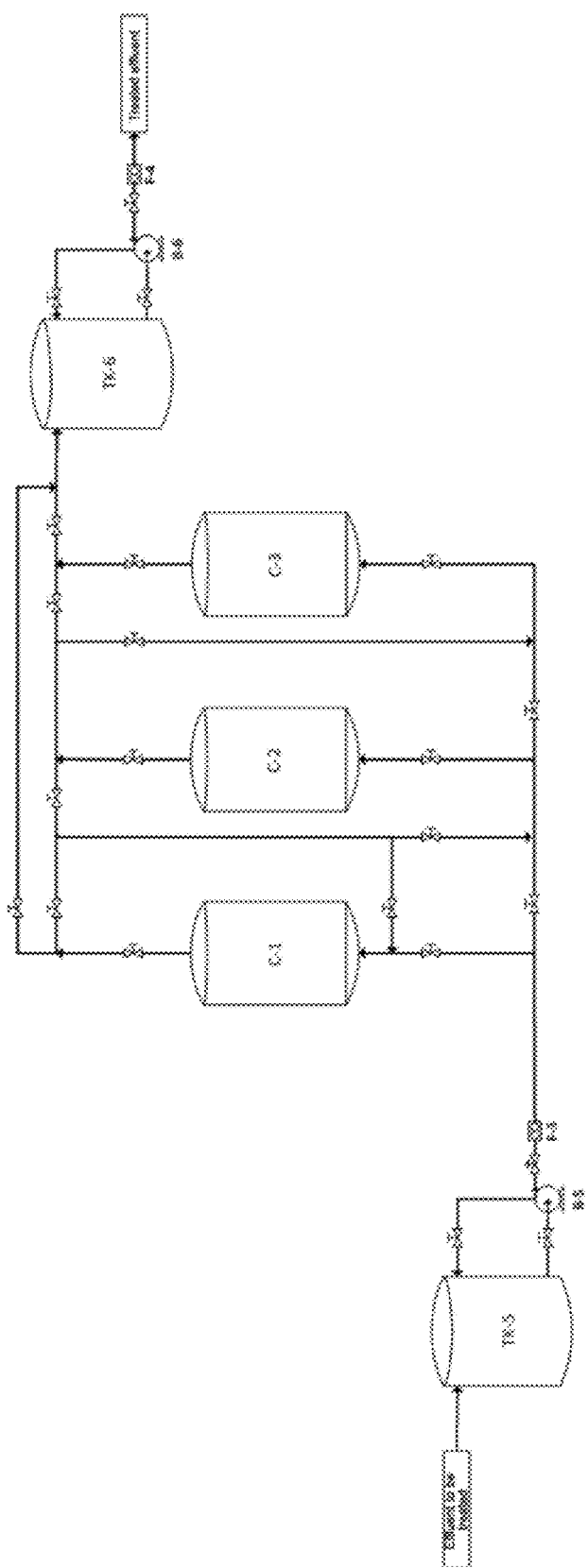
FIG. 2 shows a view of the columns in operation while the removal system of the treatment system of FIG. 1 is operating.
Figure 5:
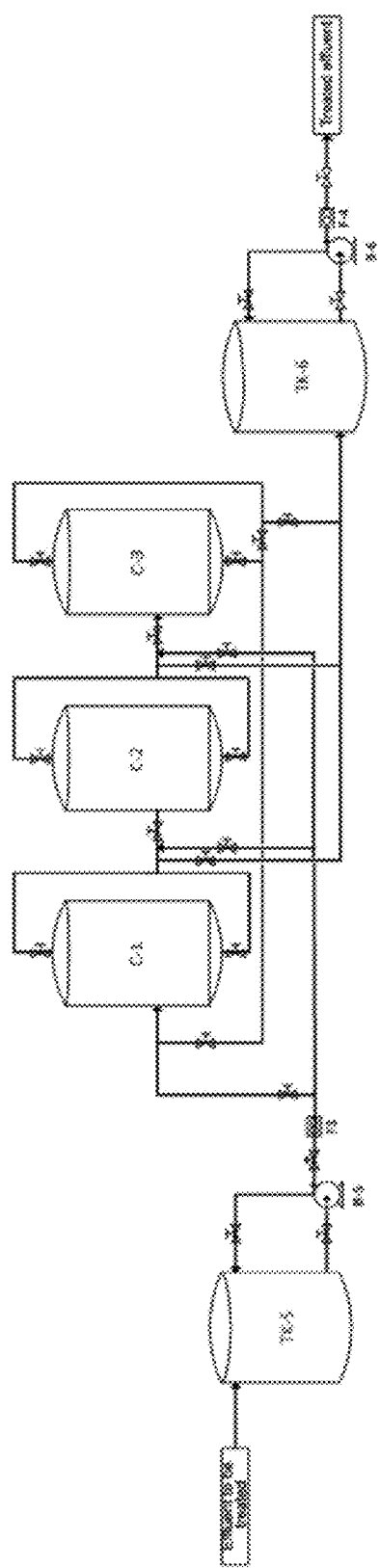
FIG. 5 shows a view of the columns in operation while the removal system of the treatment system of the present invention is operating, but where the column feed has been modified in the middle of the column.
Figure 6:
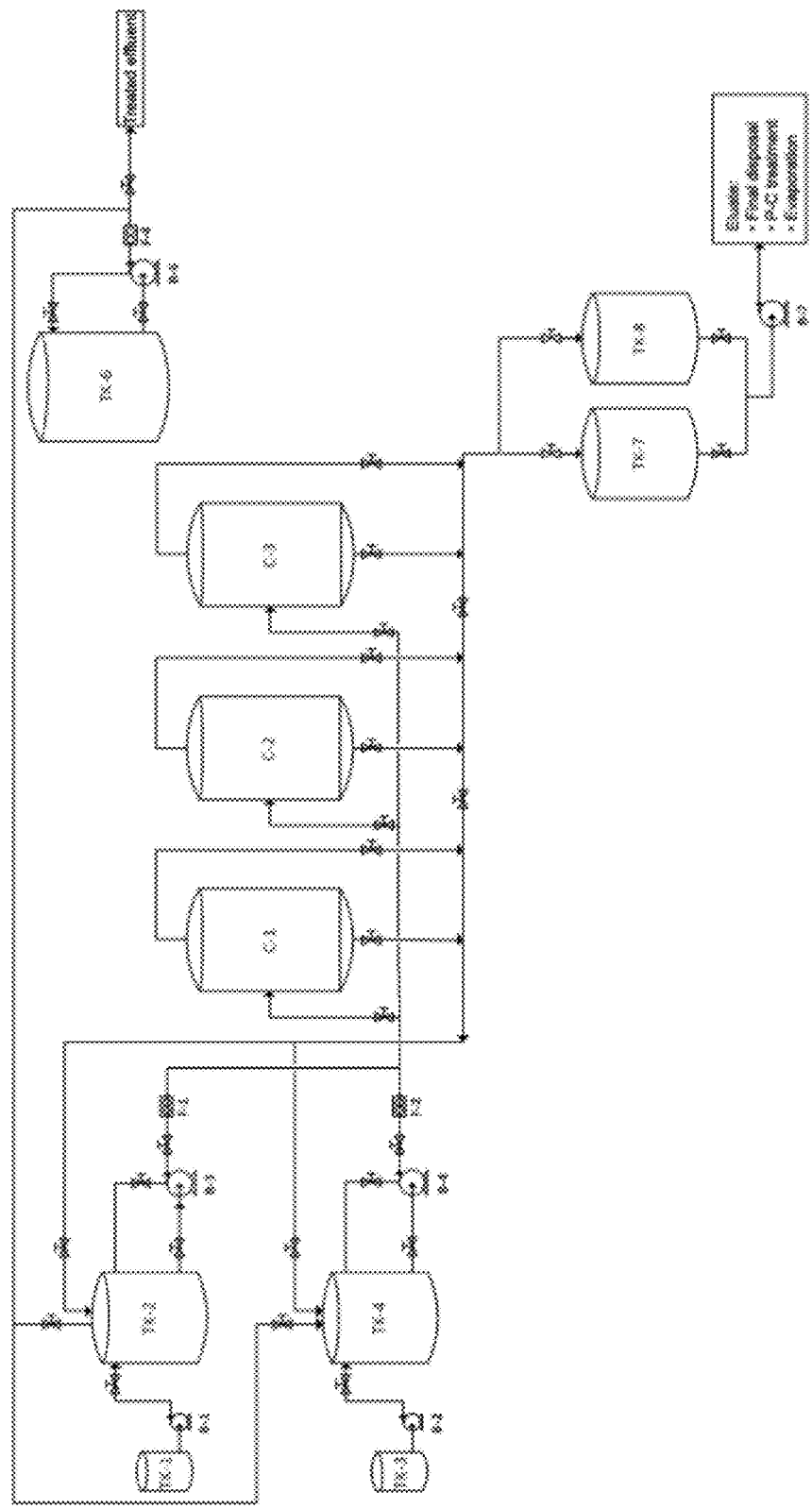
FIG. 6 shows the variant representative of the column regeneration system that operates together with the removal system of FIG. 5.

The columns in the step of removing boron can operate in three modes, namely: the flow to be treated entering in the lower part of the column (see FIG. 2), the flow to be treated entering in the mid-area of the column and once inside the column it splits into two flows, one flowing upwards and the other one flowing downwards inside the column (see FIG. 5), or the flow to be treated entering through the upper part of the column (not shown).

The Step of Removing Boron in the Columns, According to the Three Modes Described Comprises:

i) circulating the water to be treated from the tank (TK-5) by means of the pump (B-5);

ii) the water flow to be treated entering the first column C-1 in the lower part, or in the mid-area, or in the upper part thereof (this first column is referred to as a fining column);

iii) circulating the water flow to be treated through column C-1 such that the outflow containing the water treated in said column C-1 exits column C-1 in the upper part, or in the upper and lower parts, or in the lower part thereof;

iv) said outflow of column C-1 entering the lower part, or in the mid-area, or in the upper part of the second column C-2 (this second column is referred to as a refining column);

v) circulating said outflow of column C-1 through column C-2 such that the outflow of said column C-2 exits column C-2 in the upper part, or in the upper and lower parts, or in the lower part thereof;

vi) transferring the outflow of column C2 containing the water treated in said column C-2 to the treated water accumulation tank TK-6; and vii) after a given time, measuring the boron concentration in the refining column and comparing said value with the standard value of boron in sewage, such that if said value is less than or equal to the standard, columns C-1 and C-2 are kept in operation, but if said value is higher than the standard, column C-1 is disconnected and the step of regeneration of said column C-1 starts and the third column C-3 is connected, column C-2 now being the fining column and column C-3 now being the refining column;

viii) performing the preceding steps i) to vi) again but considering that now the second column C-2 is equivalent to the first column C-1, the third column C-3 is equivalent to the second column C-2 and the first column C-1 is equivalent to the third column C-3;

ix) after a given time, measuring the boron concentration in the refining column and comparing said value with the standard value of boron in sewage, such that if said value is less than or equal to the standard, columns C-2 and C-3 are kept in operation, but if said value is higher than the standard, column C-2 is disconnected and the step of regeneration of said column C-2 starts and column C-1, which has already been regenerated, is connected, column C-3 now being the fining column and column C-1 now being the refining column;

x) performing the preceding steps i) to vi) again but considering that now the third column C-3 is equivalent to the first column C-1, the first column C-1 is equivalent to the second column C-2 and the second column C-2 is equivalent to the third column C-3;

xi) after a given time, measuring the boron concentration in the refining column and comparing said value with the standard value of boron in sewage, such that if said value is less than or equal to the standard, columns C-3 and C-1 are kept in operation, but if said value is higher than the standard, column C-3 is disconnected and the step of regeneration of said column C-3 starts and column C-2, which has already been regenerated, is connected, column C-1 now being the fining column and column C-2 now being the refining column; and xii) repeating steps i) to xi).

When column C3 is the refining column and the value of boron concentration at the outlet of said column is greater than that of the standard, column C-2 enters regeneration mode and is therefore disconnected while at the same time all the valves involved in the treatment close. At this time column C-3 becomes the fining column and when the valve located to the right of the outlet of C-3 closes, the outflow is diverted to the left of the outlet of C-3, to after column C-2, where it drops down to enter column C-1, now becoming the refining column. In this configuration, C-3 fining and C-1 refining, when the boron concentration at the outlet of C-1 is less than the standard, the valve of the upper flow is activated such that the outflow passes directly into the treated water tank TK-6.

The double-column method allows the first column to be the one that captures the most boron, for which it is referred to as a fining column. The second column acts like a complement of the first column, since its function is to lower trace amounts of the contaminant that the first column could not retain, so it is referred to as a refining column.

This double-column system allows saturating the resin of the first column, assuring its maximum utilization, since flow to be treated continues to enter said column until most of the particles of the resin bed are saturated, because the second column allows retaining the boron that is not retained in the first column, thereby assuring system effectiveness.

Once the fining column is saturated, regeneration thereof starts, at which time the initial feed is changed to the second column, and said column starts to operate as a fining column and the third column will now act as a refining column. Table 3 below shows the three possible configurations for this system.

TABLE 3

Possible configurations for the operation of columns C-1, C-2 and C-3

| Item | C1 | C2 | C3 |
|---|---|---|---|
| Configuration 1 | First column | Second column | Standby or regeneration |
| Configuration 2 | Standby or regeneration | First column | Second column |
| Configuration 3 | Second column | Standby or regeneration | First column |

Figure 3:
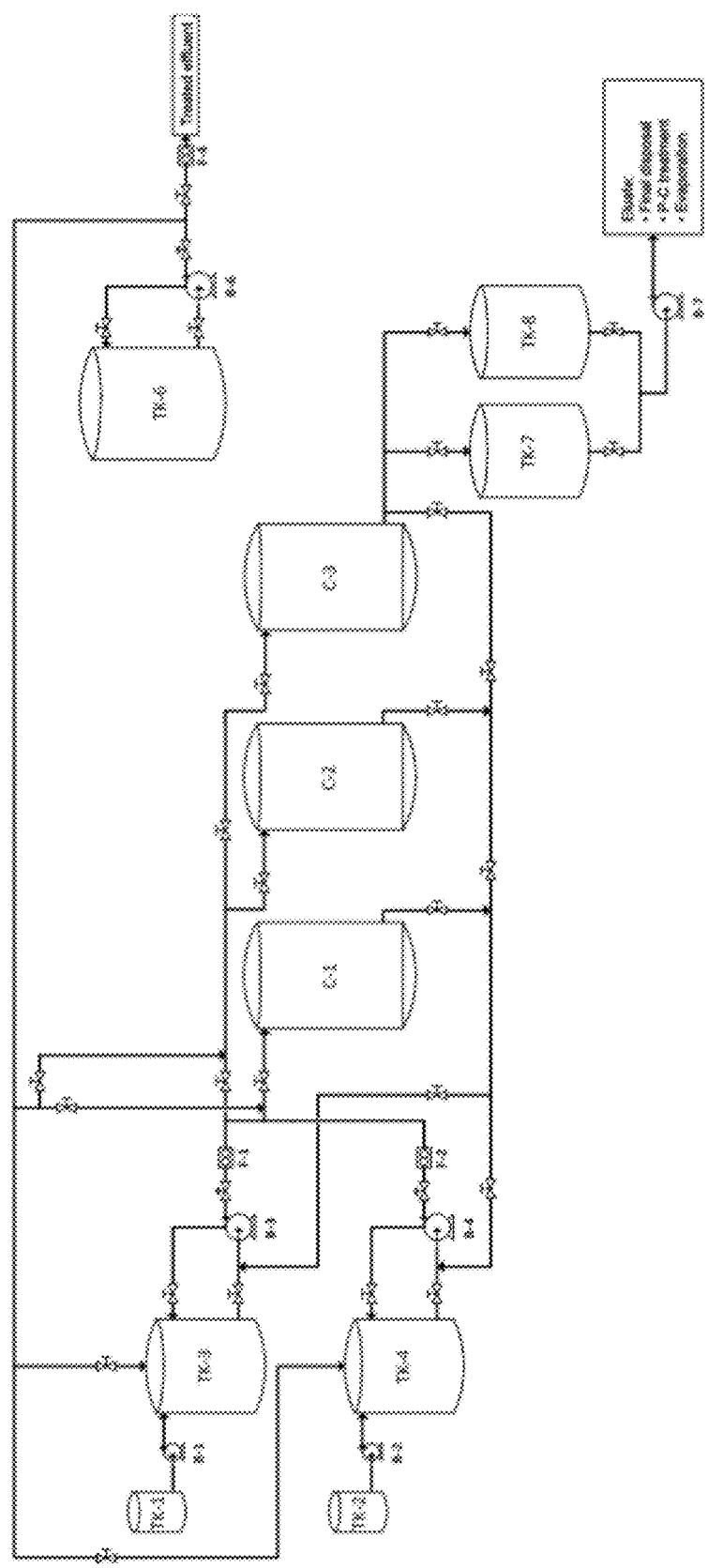
FIG. 3 shows a view representative of the column regeneration system of the treatment system of FIG. 1.

Step of Regeneration (FIG. 3)

The step of regeneration is performed in parallel while the step of removal continues in the other columns, which are not saturated.

In the step of regeneration of the saturated resin contained in the column that has been disconnected, firstly, a 1-10% sulfuric acid solution ($H_2SO_4$) or another regenerating acid solution is used to extract boron from the resin as boric acid. Then a 1-10% sodium hydroxide solution (NaOH) or another regenerating base solution is used so that it can remove the H+ ions given up by the acid of the polyol groups of the resin, which are responsible for capturing boron.

The regeneration cycles depend on the initial concentration of the flow to be treated and on the size of the column containing the ionic resin.

The acidic regeneration solution is prepared by mixing the treated water that is recirculated into the system and the 98% concentrated sulfuric acid stored in TK-1, and the basic regeneration solution is prepared by mixing the treated water that is recirculated into the system and the 50% concentrated sodium hydroxide which is stored in TK-2. The acidic regeneration solution is prepared and stored in TK-3 and the basic regeneration solution is prepared and stored in TK-4.
The Step of Regeneration of the Column Comprises:
  adding a sulfuric acid solution at a concentration of between about 1 and 10% in an amount equivalent to about 1 to 3 saturated resin bed volumes (1-3 BV (bed volume)), said volume is added in the upper side, or in the mid-area, or in the lower side of the column, depending on if the entry in the fining column, in the step of removal, was in the lower part, or in the mid-area, or in the upper part, respectively;
  recirculating said acidic solution for about 1 hour;
  washing the column with water in an amount equivalent to about 2 to 5 resin bed volumes (2-5 BV), without recirculation, and the flow entering the column, in the same place where the acidic solution entered; the water allows removing trace amounts of acid that may remain in the column;
  adding a sodium hydroxide solution at a concentration of between about 1 and 10% in an amount equivalent to about 1 to 3 saturated resin bed volumes (1-3 BV), said volume is added to the column in the same place where the acidic solution and water entered;
  recirculating said basic solution for about 1 hour; and
  washing the column with water in an amount equivalent to about 2 to 5 resin bed volumes (2-5 BV), without recirculation, and the flow also entering the column, in the same place where the acidic solution, water and basic solution entered, and the water allows removing trace amounts of sodium hydroxide that may remain in the column.

The volumes used in the step of acid (acidic eluate) washing are sent to the acidic eluate accumulation tank (TK-7), and the volumes used in the step of basic (basic eluate) washing are sent to the basic eluate accumulation tank (TK-8).

EXAMPLE

The following example corresponds to a case applied for the treatment of water captured in a sector of Maricunga, Third Region, the input conditions and physicochemical parameters used for the design of the modular treatment system are shown in Table 4:

TABLE 4

Input condition/parameter of the water to be treated

| Condition/parameter | Unit | Characteristic of the water to be treated |
|---|---|---|
| Flow rate | [m$^3$/day] | 160-220 |
| pH | | 8.1 |
| Sodium | [mg/l] | 267 |
| Alkalinity | [mg/l] | 70.2 |
| Cobalt | [mg/l] | <0.05 |
| Lithium | [mg/l] | <0.01 |
| Nickel | [mg/l] | <0.01 |
| Silver | [mg/l] | <0.01 |
| Boron | [mg/l] | 15.4 |
| Chromium | [mg/l] | <0.01 |
| Mercury | [mg/l] | <0.001 |
| Selenium | [mg/l] | <0.001 |
| Sulfate | [mg/l] | 665 |
| Fluorine | [mg/l] | 0.201 |
| Nitrate | [mg/l] | <1 |
| Chloride | [mg/l] | 389 |
| Copper | [mg/l] | <0.01 |
| Iron | [mg/l] | 0.82 |
| Manganese | [mg/l] | 0.25 |
| Zinc | [mg/l] | 0.09 |
| Magnesium | [mg/l] | 32.4 |
| Molybdenum | [mg/l] | <0.1 |
| Vanadium | [mg/l] | <0.1 |
| Arsenic | [mg/l] | <0.001 |
| Cadmium | [mg/l] | <0.001 |
| Lead | [mg/l] | <0.03 |
| Cyanide | [mg/l] | <0.005 |
| Aluminum | [mg/l] | <0.1 |
| Calcium | [mg/l] | 109 |
| Phosphorus | [mg/l] | 1.2 |
| Potassium | [mg/l] | 30.1 |
| Barium | [mg/l] | <0.1 |
| Beryllium | [mg/l] | <0.1 |

The proposed configuration of the modular treatment system (FIG. 4) formed by the boron removal system and the resin regeneration system contains 1 buffer tank (1), 1 water to be treated feed pump (2), 1 module with three treatment columns arranged in series (3), 1 treated water receiving tank (4), 1 treated water distribution pump (5), 1 concentrated acid storage tank (6), 1 concentrated acid metering pump (7), 1 acidic regeneration solution storage tank (8), 1 acidic regeneration solution feed pump (9), 1 concentrated base storage tank (10), 1 concentrated base metering pump (11), 1 basic regeneration solution storage tank (12), 1 basic regeneration solution feed pump (13), 1 depleted acidic regenerating solution receiving tank (14), 1 depleted basic regenerating solution receiving tank (15), 1 depleted regenerating solution discharge pump (16) and 1 control panel (17).

Figure 4:
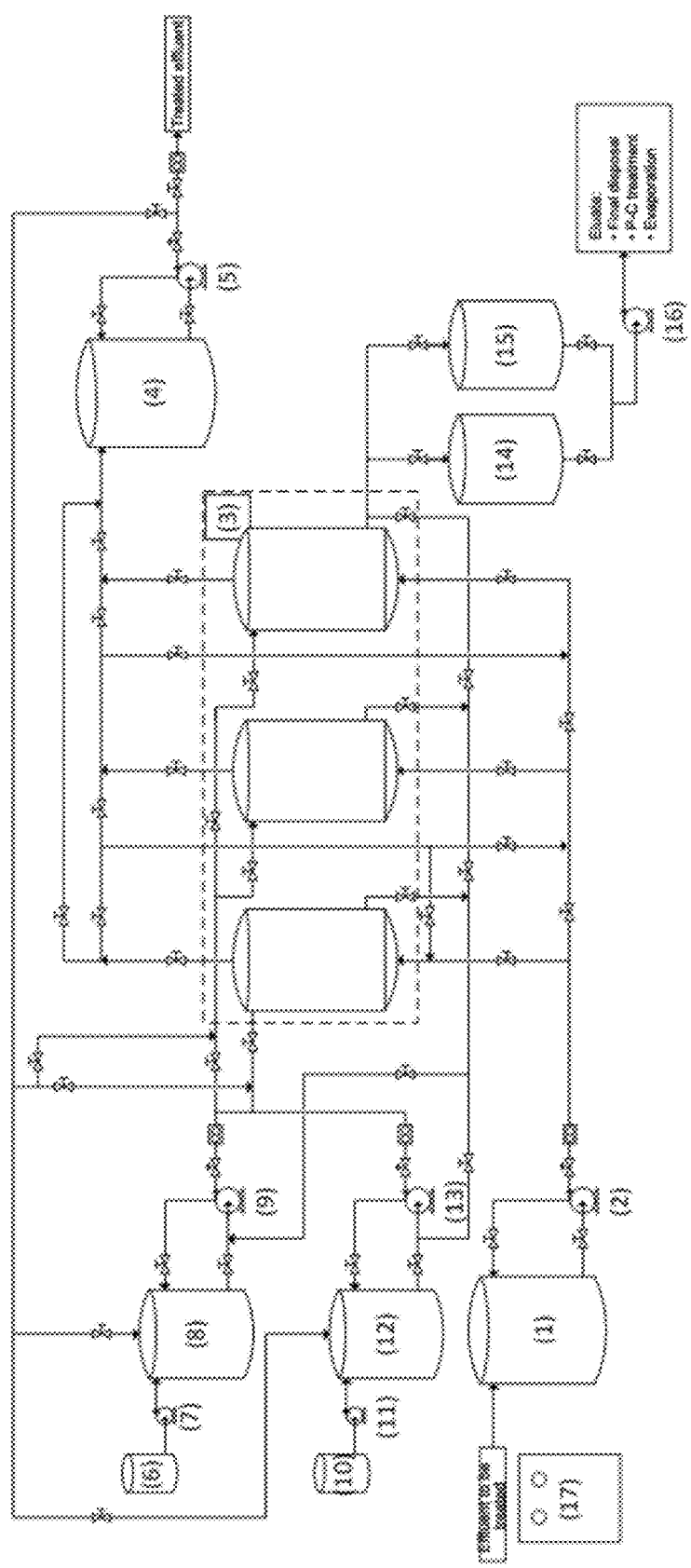
FIG. 4 shows a view of the modular treatment system applied in the example of the present invention.

FIG. 4 shows a diagram of the system used in the example, which comprises and describes the following components:
(1) Buffer tank: this is where the water to be treated accumulates; it allows controlling the flow rate to be treated.
(2) Water to be treated feed pump: this pumps the water to be treated from the buffer tank to the boron removal columns.
(3) Removal columns: this is where 99.9% of the boron is removed.
(4) Treated water receiving tank: this is where the treated water to be used for subsequent treatment, irrigation and/or as input for generating the regenerating solutions, is received.
(5) Treated water distribution pump: this pumps the treated water to a new treatment, irrigation and/or as input for preparing the regenerating solutions.
(6) Concentrated acid storage tank: this is where the concentrated acid required for preparing the acidic regenerating solution is stored.
(7) Concentrated acid metering pump: this pumps the concentrated acid to the acidic regeneration solution tank.
(8) Acidic regeneration solution tank: this is where the acidic regeneration solution is prepared and stored.
(9) 1 acidic regeneration solution feed pump for feeding acidic regeneration solution in the step of regeneration of the saturated resin.
(10) Concentrated base storage tank: this is where the concentrated base required for preparing the basic regenerating solution is stored.
(11) Concentrated base metering pump: this pumps the concentrated base to the basic regeneration solution tank.
(12) Basic regeneration solution tank: this is where the basic regeneration solution is prepared and stored.
(13) 1 basic regeneration solution feed pump for feeding basic regeneration solution in the step of regeneration of the saturated resin.
(14) Depleted acidic regenerating solution receiving tank: this is where the depleted acidic regenerating solution is stored.
(15) Depleted basic regenerating solution receiving tank: this is where the depleted basic regenerating solution is stored.
(16) Depleted regenerating solution discharge pump: this pumps the depleted regenerating solutions.
(17) Control panel: this is responsible for controlling the modular treatment system by controlling the input and output pumping of the different steps, controlling the flows and the valves.

The analytical results obtained after the treatment of the water with the modular treatment system are shown in Table 5. The measurements are taken in the treated water at the outlet of the refining column, before entering the treated water receiving tank.

The residence time per column was 2.5 minutes.

TABLE 5

Output condition/parameter of the treated water

| Condition/parameter | Unit | Characteristic of the treated water |
|---|---|---|
| pH | | 8.0 |
| Sodium | [mg/l] | 267.67 |
| Cobalt | [mg/l] | <0.05 |
| Lithium | [mg/l] | <0.01 |
| Nickel | [mg/l] | <0.01 |
| Silver | [mg/l] | <0.01 |
| Boron | [mg/l] | <0.10 |
| Chromium | [mg/l] | <0.01 |
| Mercury | [mg/l] | <0.001 |
| Selenium | [mg/l] | <0.001 |
| Sulfate | [mg/l] | 600.29 |
| Fluorine | [mg/l] | 0.200 |
| Nitrate | [mg/l] | <1 |
| Chloride | [mg/l] | 380.54 |
| Copper | [mg/l] | <0.01 |
| Iron | [mg/l] | 0.81 |
| Manganese | [mg/l] | 0.26 |
| Zinc | [mg/l] | 0.08 |
| Magnesium | [mg/l] | 31.78 |
| Molybdenum | [mg/l] | <0.1 |
| Vanadium | [mg/l] | <0.1 |
| Arsenic | [mg/l] | <0.001 |
| Cadmium | [mg/l] | <0.001 |
| Lead | [mg/l] | <0.03 |
| Cyanide | [mg/l] | <0.005 |
| Aluminum | [mg/l] | <0.1 |
| Calcium | [mg/l] | 91.63 |
| Phosphorus | [mg/l] | 0.93 |
| Potassium | [mg/l] | 29.89 |
| Barium | [mg/l] | <0.1 |
| Beryllium | [mg/l] | <0.1 |

In the results listed in Table 5, it can be seen that the treated water virtually does not contain boron, which allows demonstrating efficiency of the modular treatment system of the present invention.

Operational Results

The double-column fining—refining configuration of the modular treatment system described above allows lowering operating costs in the treatment of water contaminated with boron since greater utilization of the resin takes place, and the same column can still be used more times without having to stop the process.

Figure 7:
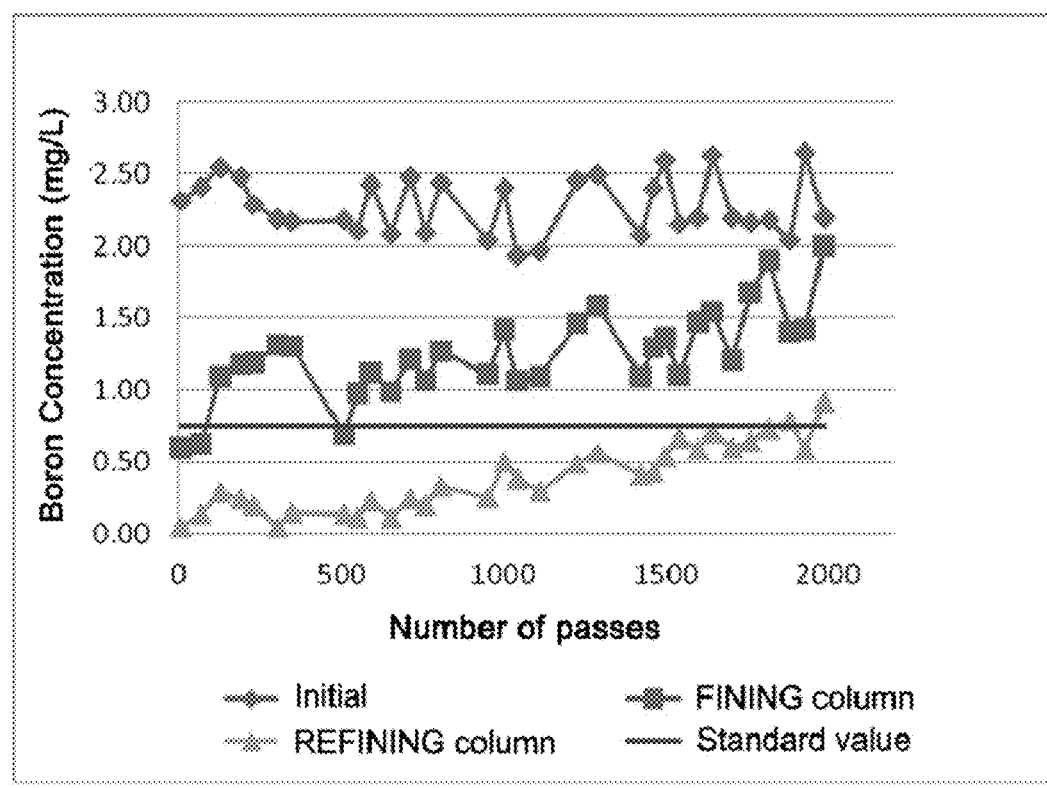
FIG. 7 shows a comparative graph of the results obtained with the treatment system of the present invention with respect to what is known in the prior art.

FIG. 7 shows a comparative graph between the modular treatment system of the present invention and a single-column treatment system. It can be seen in the graph that straight line represents the boron standard, i.e. the maximum allowable boron concentration in sewage, and the curved lines represent the experimental values of boron concentration obtained before and after treatment in the columns.

The upper curve represented by diamonds "◇" corresponds to the values of the initial boron concentration present in the water to be treated. The central curve represented by squares "■" corresponds to the values of the boron concentration present in the water once said water has been treated in the fining column. The lower curve represented by triangles "▲" corresponds to the values of the boron concentration present in the water once said water has been treated in the refining column.

The graph shows the behavior of the fining and refining columns of the modular treatment system. Conventional systems usually comprise a single column packed with ionic resin, which corresponds to the fining column. As shown in FIG. 7, shortly after the operation the resin of the column is saturated, since the values of the boron concentration in the treated water start to exceed the standard allowed, and therefore the system must be stopped and the resin must be regenerated. The modular treatment system of the present invention complements this column with a second column packed with ionic resin, which corresponds to the refining column. As can be seen in FIG. 7, the system of the present invention allows treating about one volume of water contaminated with boron 8 times more than the volume of water with boron that can be treated in a single column without having to regenerate the resin, which involves using 8 times less the chemical product inputs used for resin regeneration.

The obtained results allow asserting that the modular treatment system of the present invention reduces operating costs by up to 50% with respect to conventional ion exchange technology because the system of the present invention requires fewer resin regenerations, thereby reducing the volume of eluates generated with the present invention to 1-3% of eluates generated versus 5-8% of eluates generated with conventional technology, which means that input and eluate disposal costs are lower, thereby also helping to prolong the service life of the resin.

Another important aspect is that since the fining column is more saturated, it can be extracted by means of more concentrated and purer regeneration boric acid (29.041 mg/l versus 341 mg/l), which allows the use thereof as a byproduct with market value, so it would not have to be managed and disposed of as a waste, but rather could be reused as a fungicide or fertilizer (commercial use of boric acid).

The conducted tests verify that with respect to the most competitive technology existing on the market based on ion exchange for reducing boron, the service life of the resin used as the main input increases at least 2-fold, and its efficiency in boron removal increases more than 8-fold and the generation of waste that must be managed and disposed of drops 5-fold. All this translates into a 50% lower operating cost. The system of the present invention allows removing about 99% of the boron present in the water to be treated.

The technology of the present invention allows saving 50% of the resin, which is the main input used for the method, meaning that instead of estimating replacing the resin every 3-5 years, it would be replaced every 5-10 years. In addition to reducing replacement costs, it allows decreasing resin waste to be disposed of, which increases its sustainability and reduces its environmental impact.

Since the described system increases treatment efficiency, it uses 8-fold less chemical product inputs required for "regenerating" the resin when it is silted up (necessary acidic and basic solutions).

Boron-contaminated water treatability studies were conducted on a laboratory level, and said studies are scalable to the treatment systems of the present invention on a scale of 1 to 10,000. The different water that was treated included water from the Lluta river with 32 [mg/l] of boron, and the Arica urban water with a boron content of 10 [mg/l].

In the Atacama Region, twelve treatability studies were also performed on irrigation water samples from the Valle de Copiapö and Huasco. Average concentrations in this region are between 0.5 and 6 [mg/l] of boron.

The operating conditions and the results obtained in the treatability studies performed are shown in Tables 7, 8, 9 and 10. The initial concentration of the water to be treated is identified as Ci. In turn, the specific resin used has a real density of 1.18 g/cc, an apparent density of 0.76 g/cc and a porosity of $V_{effective}/V_{bed}$ of 0.45 for Table 7 and 0.36 for Tables 8, 9 and 10.

TABLE 7

Boron adsorption wave for the Lluta river effluent Operating conditions

| | Resin specific for boron | Resin mass [g] | Real density (g/cc) | Apparent density (g/cc) | Porosity ($V_e/V_{bed}$) | Bed volume [ml] | Effective volume [ml] | Residence time (minutes) | Flow rate (ml/min) |
|---|---|---|---|---|---|---|---|---|---|
| Adsorption | Ci 29 mg/l | 30 | 1.18 | 0.76 | 0.45 | 44.14 | 20.14 | 40.28 | 0.50 |

Obtained results

| Accumulated volume (ml) | No. of passes | Final boron C (mg/l) | Total q (mg/g) |
|---|---|---|---|
| 50 | 2.5 | 0.25 | |
| 350 | 17.4 | 0.14 | |
| 456 | 22.6 | 0.1 | |
| 510 | 25.3 | 0.06 | |
| 600 | 29.8 | 0.06 | |
| 733 | 36.4 | 0.03 | |
| 1308 | 65 | 0.1 | |
| 1933 | 96 | 0.08 | |
| 2333 | 115.9 | 0.08 | |
| 3978 | 197.5 | 0 | |
| 5013 | 214 | 0 | |
| 5013 | 248.9 | 9 | |
| 5148 | 255.6 | 14 | |
| 5498 | 273 | 18.4 | |
| 5673 | 281.7 | 21.7 | |
| 6038 | 299.8 | 28 | 6.1 |

The total boron capture capacity obtained with the resin until saturation of the material was 6.1 mg/g, the number of passes to breaking between 215-245, which is equivalent to the treatment of 6 liters of effluent with 30 grams of resin. The number of passes is a parameter indicative of the treatment capacity of the adsorbent material since it is a ratio of the total volume treated and the effective volume in the column.

Figure 8:
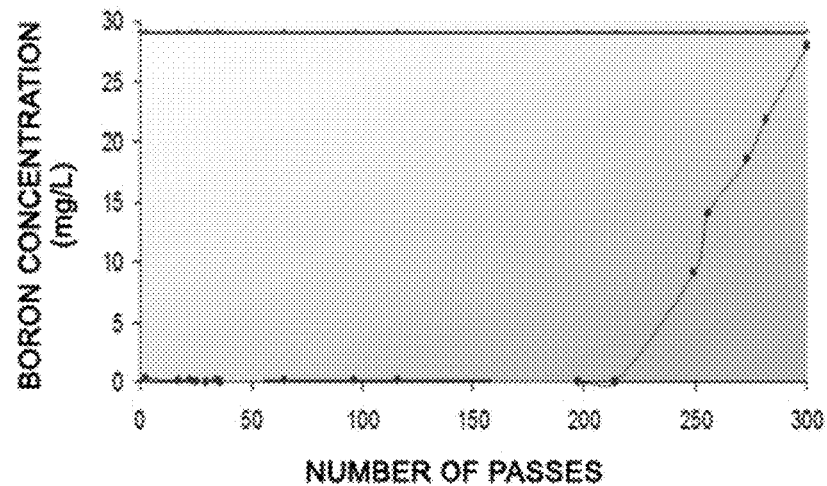
FIG. 8 shows a graph of the results obtained from the Lluta river effluent.

The obtained results can be seen in graph form in FIG. 8, where the upper curve represents the initial boron concentration in the water to be treated and the lower curve corresponds to the final boron concentration in the treated water. As can be seen after about 220 passes, the final boron concentration in the treated water starts to increase, which indicates the start of saturation of the resin in the fining column.

TABLE 8

Boron adsorption wave for the Arica effluent Operating conditions

| | | Resin specific for boron | Resin mass [g] | Real density (g/cc) | Apparent density (g/cc) | Porosity ($V_{ef}/V_{bed}$) | Bed volume [ml] | Effective volume [ml] | Residence time (minutes) | Flow rate (ml/min) |
|---|---|---|---|---|---|---|---|---|---|---|
| Adsorption | Ci 10 mg/l | | 9.7 | 1.18 | 0.76 | 0.36 | 12.76 | 4.54 | 3 | 1.51 |

Obtained results

| Accumulated volume (ml) | No. of passes | Final boron C (mg/l) | Adsorbed Mg | Total q (mg/g) |
|---|---|---|---|---|
| 1400 | 308.2 | 0.03 | 308.15 | |
| 1870 | 411.6 | 0.04 | 411.60 | |
| 2090 | 460.1 | 0.01 | 460.05 | |
| 2335 | 514.0 | 0.03 | 513.97 | |
| 2555 | 562.4 | 0.07 | 562.35 | |
| 2825 | 621.9 | 0.06 | 621.80 | |
| 3085 | 679.1 | 0.05 | 679.04 | |
| 3365 | 740.7 | 0.02 | 740.71 | |
| 3465 | 762.7 | 0.00 | 762.74 | |
| 3565 | 784.8 | 0.00 | 784.76 | |
| 3665 | 806.8 | 0.10 | 806.66 | |
| 3740 | 823.3 | 0.14 | 823.14 | |
| 3980 | 876.1 | 0.06 | 876.05 | |
| 4018 | 884.5 | 0.25 | 884.23 | |
| 4118 | 906.5 | 0.25 | 906.24 | |
| 4218 | 928.5 | 0.50 | 928.00 | 4.088 |

The total boron capture capacity obtained with the resin until saturation of the material was 4.088 mg/g, the number of passes to breaking between 928, which is equivalent to the treatment of 4.218 liters of effluent with 9.7 grams of resin, until reaching the desired concentration equal to 0.5 mg/l at the outlet of the treatment.

Figure 9:
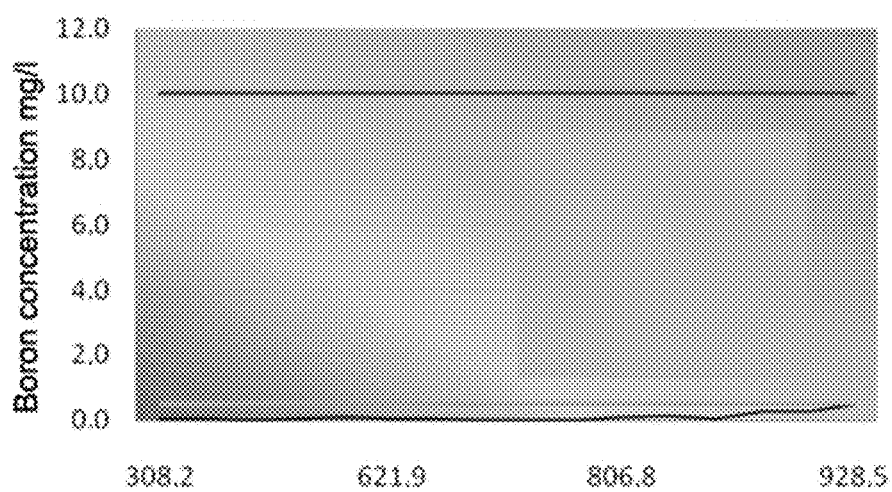
FIG. 9 shows a graph of the results obtained from the Arica effluent.

The obtained results can be seen in graph form in FIG. 9, where the upper curve represents the initial boron concentration in the water to be treated and the lower curve corresponds to the final boron concentration in the treated water. The curve located immediately above the curve representing the final boron concentration in the treated water corresponds to the curve of the desired boron concentration to be obtained in the already treated water. As can be seen, after about 800 passes the final boron concentration in the treated water starts to increase, which indicates the start of saturation of the resin in the fining column.

The total boron capture capacity obtained with the resin until saturation of the material was 3.36 mg/g, the number of passes to breaking was 4.352, which is equivalent to the treatment of 32 ml of effluent with 15.7 grams of resin, until reaching the desired concentration equal to 0.75 mg at the outlet of the treatment.

Figure 10:
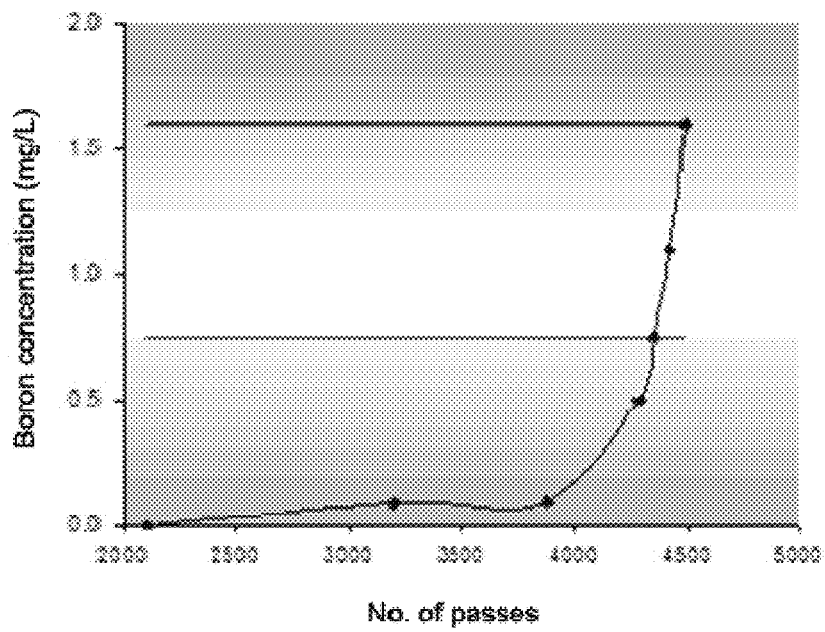
FIG. 10 shows a graph of the results obtained from the Valle de Copiapö effluent.

The obtained results can be seen in graph form in FIG. 10, where the upper curve represents the initial boron concentration in the water to be treated and the lower curve corresponds to the final boron concentration in the treated water. The curve located in the middle, between the two other curves, represents the desired boron concentration to be obtained in the already treated water. As can be seen, after about 3,000 passes, the final boron concentration in the treated water starts to increase, which indicates the start of saturation of the resin in the fining column.

TABLE 9

Adsorption wave for Valle de Copiapó; Operating conditions

| | | Resin specific for boron | Resin mass [g] | Real density (g/cc) | Apparent density (g/cc) | Porosity ($V_{ef}/V_{bed}$) | Bed volume [ml] | Effective volume [ml] | Residence time (minutes) | Flow rate (ml/min) |
|---|---|---|---|---|---|---|---|---|---|---|
| Adsorption | Ci 1.6 mg/l | | 15.7 | 1.18 | 0.76 | 0.36 | 20.66 | 7.35 | 9 | 0.82 |

Obtained results

| Accumulated volume (ml) | No. of passes | Final boron C (mg/l) | Adsorbed Mg | Total q (mg/g) |
|---|---|---|---|---|
| 15.5 | 2.100 | 0 | 24.8 | |
| 23.5 | 3.196 | 0.09 | 12.79 | |
| 28.5 | 3.876 | 0.1 | 8 | |
| 31.5 | 4.282 | 0.5 | 4.79 | |
| 32 | 4.352 | 0.75 | 0.8 | |
| 32.5 | 4.420 | 1.1 | 0.799 | |
| 33 | 4.488 | 1.6 | 0.799 | 3.36 |

TABLE 10

Absorption wave for Valle de Huasco; Operating conditions

|  | Resin specific for boron | Resin mass [g] | Real density (g/cc) | Apparent density (g/cc) | Porosity ($V_e/V_{bed}$) | Bed volume [ml] | Effective volume [ml] | Residence time (minutes) | Flow rate (ml/min) |
|---|---|---|---|---|---|---|---|---|---|
| Adsorption | Ci 0.84 mg/l | 15.7 | 1.18 | 0.76 | 0.36 | 20.66 | 7.35 | 9 | 0.82 |

Obtained results

| Accumulated volume (ml) | No. of passes | Final boron C (mg/l) | Adsorbed Mg | Total q (mg/g) |
|---|---|---|---|---|
| 38 | 5.168 | 0 | 31.9 | |
| 68 | 9.248 | 0.09 | 25.2 | |
| 73 | 9.928 | 0.1 | 4.2 | |
| 76 | 10.336 | 0.56 | 2.5 | |
| 76.5 | 10.404 | 0.76 | 0.4 | |
| 77 | 10.472 | 0.79 | 0.4 | |
| 77.5 | 10.540 | 0.85 | 65.1 | 3.25 |

The total boron capture capacity obtained with the resin until saturation of the material was 3.25 mg/g, the number of passes to breaking was 10404, which is equivalent to the treatment of 76 ml of effluent with 15.7 grams of resin, until reaching the desired concentration equal to 0.75 mg at the outlet of the treatment.

Figure 11:
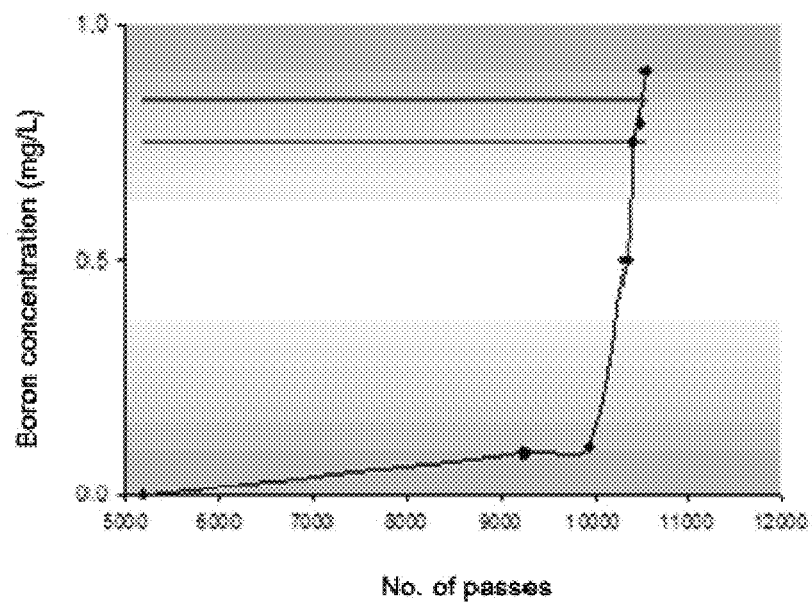
FIG. 11 shows a graph of the results obtained from the Valle de Huäsco effluent.

The obtained results can be seen in graph form in FIG. 11, where the upper curve represents the initial boron concentration in the water to be treated and the lower curve corresponds to the final boron concentration in the treated water. The curve located immediately below the curve representing the initial boron concentration in the treated water corresponds to the curve of the desired boron concentration to be obtained in the already treated water. As can be seen, after about 9,000 passes the final boron concentration in the treated water starts to increase, which indicates the start of saturation of the resin in the fining column.

The invention claimed is:

1. A process for removing boron from a water source using a multi-stage boron removal system, comprising the steps of:
    with a pump, deliver water to be treated to a storage tank TK-5;
    deliver water from storage tank TK-5 to a first resin-based ion exchange column for first cleaning, said first column being column C-1;
    deliver water from an output stream of said first receiving resin-based ion exchange column to a second resin-based ion exchange column for second cleaning, said second column being column C-2;
    deliver water from an output stream of said second resin-based ion exchange to a treated water accumulation tank TK-6;
    measure the concentration of boron in TK-6 and compare the measured value with a standard;
    if the measured value is less than or equal to the standard, leave columns C-1 and C-2 in operation,
    if the measured value is greater than the standard, disconnect column C-1 and connect a third resin-based ion exchange third column C-3 for refining;
    re-direct the output stream from TK-5 to column C-2 and, in parallel, start a process of regenerating the resin contained in column C-1;
    deliver water from an output stream of column C-2 to column C-3;
    deliver water from an output stream of column C-3 to tank TK-6;
    measure the concentration of boron in column C-3 and compare the measured value with a standard;
    if the measured value is less than or equal to the standard, leave columns C-2 and C-3 in operation;
    if the measured value is greater than the standard, disconnect column C-2 and re-connect column C-1;
    re-direct the output stream from TK-5 to column C-3 and, in parallel, start a process of regenerating the resin in column C-2;
    recirculate water flow to be treated through column C-3;
    deliver water from the output stream of column C-3 to column C-1;
    deliver water from the output stream of column C-1 to tank TK-6;
    measure the concentration of boron in column C-1 and compare the measured value with a standard;
    if the measured value is less than or equal to the standard, leave columns C-3 and C-1 in operation;
    if the measured value is greater than the standard disconnect column C-3 and re-connect column C-2;
    re-direct the output stream from TK-5 to column C-1 and, in parallel, start a process of regenerating the resin in column C-3;
    recirculate water flow to be treated through column C-1; and
    deliver water from the output stream of column C-1 to column C-2;
    wherein said system comprises three resin-based ion exchange columns, a pump, and at least two storage tanks.

2. The process according to claim 1 wherein the step of regeneration comprises the steps of:
    A) prepare an acid regeneration solution by mixing treated water with a concentrated sulfuric acid solution at 98% for an acid regeneration solution in a concentration from 1 to 10%;
    B) prepare a basic regeneration solution by mixing treated water with a sodium hydroxide solution concentrated at about 50%—to obtain a solution of for a basic regeneration solution in a concentration from 1 to 10%;
    C) add the acid solution regeneration in an amount equivalent to about 1 to 3 bed volumes of saturated resin (1-3 BV (bed volume)) column;

D) recirculate said acid solution in said column for regeneration for about 1 hour;

E) wash said column with water in an amount equivalent to about 2 to 5 bed volumes of resin (2-5 BV), without recirculation;

F) add said basic regeneration solution in an amount equivalent to about 1 to 3 bed volumes of saturated resin (1-3 BV) bed;

G) recirculate said column basic regeneration solution for about 1 hour; and

H) wash said column with water in an amount equivalent to about 2 to 5 bed volumes of resin (2-5 BV), without recirculation.

3. The process according to claim 2, wherein the water to be treated flows into the bottom of the column to be cleaned and said acid and basic regeneration solutions and wash water enter at the top of said column.

4. The process according to claim 2, wherein the water to be treated flows into the top of the column to be cleaned and said acid and basic regeneration solutions and wash water enter at the bottom of said column.

* * * * *